(12) United States Patent
Chianale et al.

(10) Patent No.: US 6,917,646 B2
(45) Date of Patent: Jul. 12, 2005

(54) CIRCUIT FOR EXCHANGING COMMUNICATIONS OVER A TRANSMISSION LINE

(75) Inventors: Alain Chianale, Saint Egreve (FR); Emmanuel Dabin, Coublevie (FR)

(73) Assignee: STMicroelectronics S.A., Montrouge (FR)

( * ) Notice: Subject to any disclaimer, the term of this patent is extended or adjusted under 35 U.S.C. 154(b) by 762 days.

(21) Appl. No.: 09/863,800

(22) Filed: May 22, 2001

(65) Prior Publication Data

US 2002/0009131 A1 Jan. 24, 2002

(30) Foreign Application Priority Data

May 23, 2000 (FR) ............................................. 00 06566

(51) Int. Cl.$^7$ ................................................. H04B 1/38
(52) U.S. Cl. .................. 375/222; 375/258; 379/395.01; 379/344; 713/324; 455/127.1
(58) Field of Search ................................. 375/211, 219, 375/222, 259, 257, 258; 379/395.01, 344, 347; 713/300, 323, 324; 455/127.1

(56) References Cited

U.S. PATENT DOCUMENTS

| 4,996,706 A | | 2/1991 | Cho ............................. 379/93 |
| 5,202,905 A | * | 4/1993 | Sakamoto et al. ........... 375/377 |
| 5,491,721 A | | 2/1996 | Cornelius et al. ............ 375/222 |
| 5,881,102 A | * | 3/1999 | Samson ....................... 375/222 |

* cited by examiner

*Primary Examiner*—Amanda T. Le
(74) *Attorney, Agent, or Firm*—Lisa K. Jorgenson; Robert Iannucci; Seed IP Law Group PLLC

(57) ABSTRACT

A circuit for exchanging communications via a transmission line, including a detector for detecting a predetermined start-of-communication signal, a means for coupling the transmission line on the one hand to a transmit line to provide outgoing communications to the transmission line, and on the other hand to a receive line, to receive incoming communications from the transmission line. The detector is connected to the transmit line.

21 Claims, 1 Drawing Sheet

CIRCUIT FOR EXCHANGING COMMUNICATIONS OVER A TRANSMISSION LINE

TECHNICAL FIELD

The present invention relates to a circuit for exchanging communications, for example according to standard "ADSL" (Asymmetrical Digital Subscriber Line). It more specifically relates to such a circuit including a start-of-communication signal detector.

BACKGROUND OF THE INVENTION

Standard ADSL is a standard defining the bidirectional transmission of digital data between a subscriber and an exchange center, which in particular provides that the exchange center can provide data to the user in a frequency range between 138 kHz and 1 MHz with a rate ranging to 8 megabits per second. This standard also provides that the user can transmit data to the exchange center in a frequency range between 30 kHz and 138 kHz, with a rate up to 1 megabit per second.

FIG. 1 shows in the form of blocks a circuit 2 enabling the computer of a subscriber (not shown) connected to a modem 4 to exchange information according to standard ADSL with an exchange center (not shown) via a twin-wire bidirectional line 6. Modem 4 has an output connected to a twin-wire transmit line 8 and an input connected to a twin-wire receive line 10. The transmit and receive lines are coupled to transmission line 6 via a two-wire/four-wire coupling means 12 commonly called a hybrid converter. A first amplifier 14 is interposed between the modem output and the transmit line and a second amplifier 16 is interposed between the receive line and the modem input. Resistors R1 and R2 in series with the outputs of amplifier 14 adapt the impedance of transmit line 8 to the impedance of transmission line 6.

According to standard ADSL, when no information is exchanged via transmission line 6, circuit 2 is in a so-called "stand-by" state, waiting for a communication. Any communication is preceded by a start-of-communication signal, or call tone, formed of several pure frequency signals. Circuit 2 must include a start-of-communication signal detector, which arouses it from its stand-by state. Conventionally, the detector is integrated to modem 4 and is connected to receive the output of amplifier 16. However, such a connection imposes letting amplifier 16 operate in a nominal mode while circuit 2 is at stand-by. The consumption of amplifier 16 thus is relatively high and, at stand-by, circuit 2 cannot comply with international standards such as the USB (Universal Serial Bus) standard, which especially determines the maximum consumption at stand-by. As an example, the consumption of an amplifier such as amplifier 16 is on the order of 100 mW/h while standard USB requires a stand-by consumption at most equal to 10 mW/h. It is thus impossible to have a circuit 2 with a low-consumption mode at stand-by.

To solve this problem, it may be devised to connect the start-of-communication signal detector directly on receive line 10, and to set amplifier 16 to a low-consumption mode. However, this solution is not retained since it is very expensive. Indeed, above all in the case where transmission line 6 is long, the signal received by amplifier 16 is sometimes very weak, reaching levels as low as 10 $\mu$V. Amplifier 16 must thus be a particularly sensitive amplifier, the forming of which is critical. This amplifier is normally directly connected to a transformer winding and its input impedance is provided according to this connection. If a signal detector circuit is added on the input of amplifier 16, the operation of this amplifier is disturbed, even if it is provided to disconnect the detector circuit when the amplifier is active. Indeed, in this last case, at least the stray capacitance of a switch ensuring said disconnection will be nevertheless added on the amplifier input.

It may also be devised to directly connect the start-of-communication signal detector to transmission line 6. This solution is also discarded because of its cost. Indeed, a significant electric isolation, on the order of 3500 V, imposed by international standards, must exist between transmission line 6 and any subscriber circuit. This isolation is performed by coupling means 12, which conventionally includes a transformer having a primary winding connected to transmission line 6, and first and second secondary windings respectively connected to transmit line 8 and to receive line 10. A detector directly connected to line 6 should exhibit the same electric isolation as coupling means 12, which would make the circuit too expensive.

SUMMARY OF THE INVENTION

An embodiment of the present invention provides a circuit for exchanging communications with a transmission line according to standard ADSL, having a low-consumption stand-by state that is inexpensive and easy to implement.

The circuit includes a detector for detecting a predetermined start-of-communication signal, means for coupling the transmission line on the one hand to a transmit line to provide outgoing communications to the transmission line, and on the other hand to a receive line, to receive incoming communications from the transmission line, the detector being connected to the transmit line.

According to an embodiment of the present invention, the circuit includes a modem having a nominal operating mode and a low-consumption operating mode, an output and an input of the modem being respectively connected to the transmit and receive lines, the detector being connected to switch the modem from its low-consumption operating mode to its nominal operating mode when it detects said predetermined signal.

According to an embodiment of the present invention, first and second amplifiers are respectively interposed between the modem output and the transmit line, and between the modem input and the receive line, the amplifiers each having a nominal operating mode and a low-consumption operating mode, the detector being connected to switch the first and second amplifiers from the low-consumption operating mode to the nominal operating mode when it detects said predetermined signal.

According to an embodiment of the present invention, the transmission line is a twin-wire line and the first amplifier includes two output terminals, each connected to a wire of the transmit line, the circuit including a switch for short-circuiting the two output terminals of the first amplifier when the first amplifier is in a low-consumption operating mode.

According to an embodiment of the present invention, the modem and the detector belong to a same integrated circuit.

According to an embodiment of the present invention, the modem, the detector, and the first and second amplifiers belong to a same integrated circuit.

According to an embodiment of the present invention, the modem, the detector, the first and second amplifiers and the switch belong to a same integrated circuit.

According to an embodiment of the present invention, the detector input is connected to the transmit line via a voltage divider.

According to an embodiment of the present invention, the coupling means includes a transformer having a primary winding connected to the transmission line and first and second secondary windings respectively connected to the transmit and receive lines.

The foregoing features and advantages of the present invention will be discussed in detail in the following non-limiting description of specific embodiments in connection with the accompanying drawings.

DETAILED DESCRIPTION OF THE INVENTION

Figure 1:
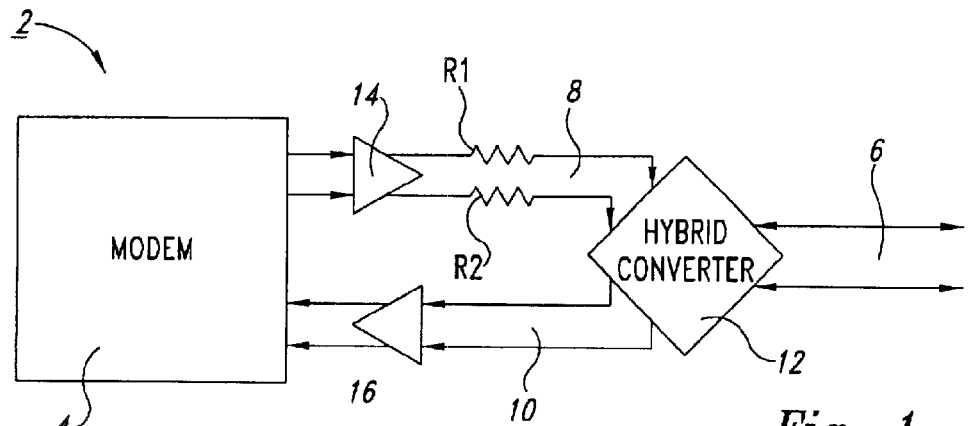
FIG. 1, previously described, is a block diagram of a circuit for exchanging communications with a transmission line according to standard ADSL.

In the following drawings, same references represent same elements as in FIG. 1. For clarity, only those elements necessary to the understanding of the present invention have been shown.

Figure 2:
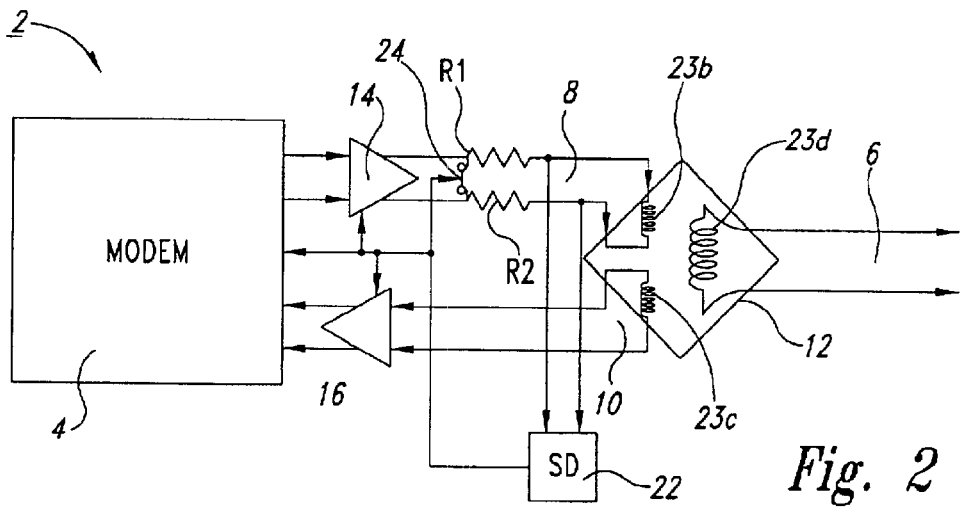
FIG. 2 is a block diagram of a circuit according to the present invention for exchanging communications with a transmission line according to standard ADSL.

FIG. 2 is a block diagram of a circuit 20 according to the present invention for exchanging communications via a transmission line 6. A modem 4 has an output and an input respectively connected to transmit and receive lines 8 and 10 via amplifiers 14 and 16. The transmit and receive lines are coupled to transmission line 6 by a coupling means 12.

According to an aspect of the present invention, a start-of-communication signal detector (SD) 22, external to modem 4, is connected to transmit line 8. Indeed, the coupling means which couples the transmission line to the transmit and receive lines is formed by a transformer, whereby the communications transmitted by the exchange center arrive on the transmit line. The transformer 12 includes a primary winding 23A connected to the transmission line 6, a first secondary winding 23B connected to the transmit line 8, and a second secondary winding 23C connected to the receive line 10. Accordingly, the start-of-communication signal is also present on transmission line 8 and it is possible to detect it there. The modem, amplifier 16, and amplifier 14 can then be switched to a low-consumption mode when circuit 20 is at stand-by. Thus, circuit 20 of the present invention can have a low consumption in low-consumption mode, for example smaller than the 10 mW/h imposed by standard USB. Circuit 20 can thus be connected to an USB port and be powered by it.

The operation of detector 22 is the following. Circuit 20 is at stand-by in a low-consumption mode when no communication exchange occurs between modem 4 and the exchange center. Only detector 22 then is in nominal operation. Detector 22 is designed to detect a start-of-communication signal and, in practice, it may only detect a single one of the pure frequencies which form the start-of-communication signal. When detector 22 detects a start-of-communication signal, it has modem 4 and amplifiers 14 and 16 switch out of their low-consumption operating mode to the nominal operating mode. Modem 4 can then receive the communication that follows the start-of-communication signal.

Transmit line 8 must have an impedance matching the impedance of transmission line 6. This impedance matching is conventionally performed by two resistors R1 and R2 arranged on line 8 in series with the outputs of amplifier 14. Now, generally, the output impedance of amplifier 14 is substantially null when said amplifier is in nominal operating mode and it is very high when the amplifier is in low-consumption operating mode. For this reason, in FIG. 2, a switch 24 is provided to short-circuit the two output terminals of amplifier 14 when circuit 20 is in low-consumption mode. When detector 22 detects a start-of-communication signal, switch 24 opens. This enables keeping a matched transmit line, whether circuit 20 is in low-consumption mode or not.

Figure 3:
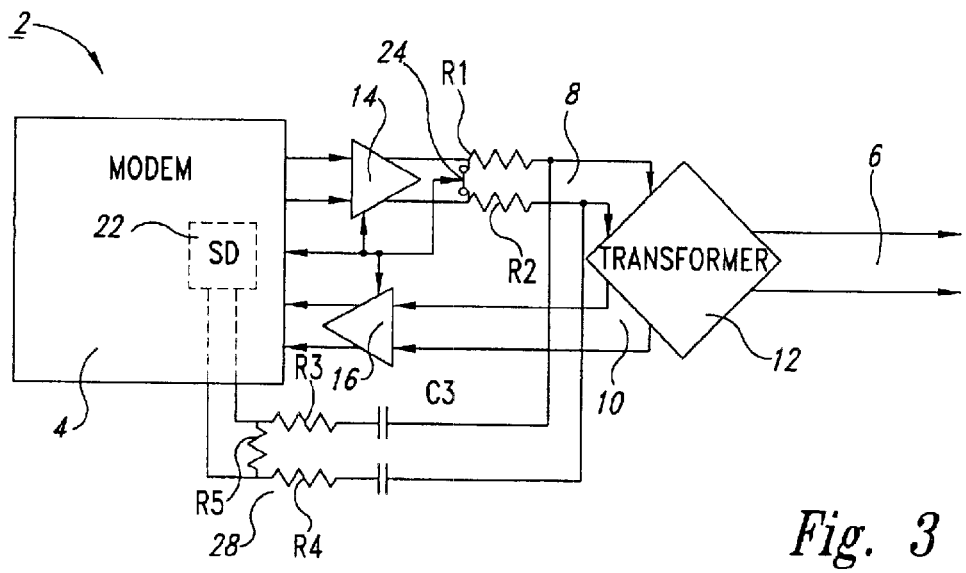
FIG. 3 shows an alternative embodiment of a circuit according to the present invention.

FIG. 3 shows in the form of blocks a circuit 26 according to the present invention in which detector 22 is integrated in modem 4. Detector 22 and modem 4 then have common supply voltages. It is provided to connect the input of detector 22 to transmit line 8 via a voltage divider 28, for example formed by two resistors R3 and R4 of same value each connected in series to a wire of the transmit line, and interconnected by a resistor R5. Optional capacitances C3 and C4, intended for suppressing possible continuous components, are connected in series respectively with resistors R3 and R4. The voltage levels present on transmit line 8, defined by standard ADSL, may be too high as compared to the common supply voltages of detector 22 and of modem 4. Thus, the values of resistors R3, R4, and R5 are chosen so that the voltages provided at the input of detector 22 are not greater than the supply voltages of modem 4. As an example, resistors R3 and R4 may have a value of 100 kΩ and resistor R5 may have a value of 200 kΩ.

Of course, the present invention is likely to have various alterations, modifications, and improvements which will readily occur to those skilled in the art.

Thus, amplifiers 14 and 16 have been described as being external to modem 4, but they may also be integrated to the modem. The same can be said for switch 24.

Thus, switch 24 may be a transistor or any other switching element adapted to performing the same functions. A resistor of low value corresponding to the output impedance of amplifier 14 in nominal operating mode may also be connected in series with the switch.

Also, coupling means 12 may be of any appropriate type. Also, the transformer of the coupling means may include more than two secondary windings.

The present invention has been described in the context of standard ADSL, but the present invention of course also applies to standard VDSL, where frequencies ranging to 12 MHz are used, as well as to any standard of xDSL type. Generally speaking, the present invention applies to any circuit adapted to exchanging communications via a transmission line, and including a transmit line and a receive line.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for exchanging communications via a transmission line, including:

a means for coupling the transmission line on the one hand to a transmit line to provide outgoing communications to the transmission line, and to a receive line, to receive incoming communications from the transmission line; and a detector for detecting a predetermined start-of-communication signal wherein the detector is connected to the transmit line without being connected to the receive line.

2. The circuit of claim 1, including a modem having a nominal operating mode and a low-consumption operating mode, an output and an input of the modem being respectively connected to the transmit and receive lines, the detector being connected to switch the modem from its low-consumption mode to its nominal mode when the detector detects said start-of-communication signal.

3. A circuit for exchanging communications via a transmission line, including:

a means for coupling the transmission line on the one hand to a transmit line to provide outgoing communications to the transmission line, and to a receive line, to receive incoming communications from the transmission line;

a detector for detecting a predetermined start-of-communication signal wherein the detector is connected to the transmit line; and a modem having a nominal operating mode and a low-consumption operating mode, an output and an input of the modem being respectively connected to the transmit and receive lines, the detector being connected to switch the modem from its low-consumption mode to its nominal mode when the detector detects said start-of-communication signal, wherein first and second amplifiers are respectively interposed between the modem output and the transmit line, and between the modem input and the receive line, the amplifiers each having a nominal mode and a low-consumption mode, the detector being connected to switch the first and second amplifiers from the low-consumption mode to the nominal mode when the detector detects said predetermined signal.

4. The circuit of claim 3, wherein the modem, the detector, and the first and second amplifiers belong to a same integrated circuit.

5. The circuit of claim 3, wherein the transmit line is a twin-wire line and the first amplifier includes two output terminals, each connected to a wire of the transmit line, the circuit including a switch for short-circuiting the two output terminals of the first amplifier when the first amplifier is in a low-consumption mode.

6. The circuit of claim 5, wherein the modem, the detector, the first and second amplifiers and the switch belong to a same integrated circuit.

7. A circuit for exchanging communications via a transmission line, including:

a means for coupling the transmission line on the one hand to a transmit line to provide outgoing communications to the transmission line, and to a receive line, to receive incoming communications from the transmission line;

a detector for detecting a predetermined start-of-communication signal wherein the detector is connected to the transmit line; and a modem having a nominal operating mode and a low-consumption operating mode, an output and an input of the modem being respectively connected to the transmit and receive lines, the detector being connected to switch the modem from its low-consumption mode to its nominal mode when the detector detects said start-of-communication signal, wherein the modem and the detector belong to a same integrated circuit.

8. The circuit of claim 7 wherein the detector input is connected to the transmit line via a voltage divider.

9. A circuit for exchanging communications via a transmission line, including:

a means for coupling the transmission line on the one hand to a transmit line to provide outgoing communications to the transmission line, and to a receive line, to receive incoming communications from the transmission line; and a detector for detecting a predetermined start-of-communication sianal wherein the detector is connected to the transmit line, wherein the coupling means includes a transformer having a primary winding connected to the transmission line and first and second secondary windings respectively connected to the transmit and receive lines.

10. A circuit for exchanging communications via a transmission line, comprising:

a modem with a signal input and a signal output;

a transmit line coupled to the signal output of the modem and structured to transmit signals from the modem to the transmission line, the transmit line having a node;

a receive line coupled to the signal input of the modem and structured to receive signals directed from the transmission line to the modem;

a coupler coupled to the transmission line, transmit line, and receive line structured to pass signals from the transmit line to the transmission line and to pass signal from the transmission line to the receive line; and a detector connected to the transmit line at the node, the detector being structured to detect start-of-communication signal received from the transmission line via the coupler.

11. The circuit of claim 10 wherein the modem has a nominal operating mode and a low-consumption operating mode, the detector being connected to switch the modem from the low-consumption mode to the nominal mode in response to detecting the start-of-communication signal.

12. The circuit of claim 10, further comprising a first amplifier interposed between the modem output and the transmit line and a second amplifier interposed between the receive line and the modem input, the amplifiers each having a nominal mode and a low-consumption mode, the detector being connected to switch the first and second amplifiers from the low-consumption mode to the nominal mode in response to detecting the start-of-communication signal.

13. The circuit of claim 12 wherein the transmit line includes first and second wires and the first amplifier includes first and second output terminals connected respectively to the first and second wires, the circuit further comprising a switch that short-circuits the output terminals of the first amplifier when the first amplifier is in the low-consumption mode.

14. The circuit of claim 10 wherein the modem and the detector belong to a same integrated circuit.

15. The circuit of claim 10, further comprising a voltage divider connected between the detector and the node of the transmit line.

16. The circuit of claim 10 wherein the coupler means includes a transformer having a primary winding connected to the transmission line and first and second secondary windings respectively connected to the transmit and receive lines.

17. A method exchanging communications via a transmission line, the method comprising:

transmitting communication signals on a transmit line from a modem to the transmission line when the modem is in a nominal mode;

receiving a start-of-communication signal from the transmission line to the transmit line when the modem is in a low-consumption standby mode; and detecting the start-of-communication signal on the transmit line.

18. The method of claim 17, further comprising switching from the standby mode to the nominal mode in response to detecting the start-of-communication signal.

19. The method of claim 17 wherein the transmit line includes first and second wires, the method further comprising shorting together the first and second wires of the transmit line during the standby mode.

20. The method of claim 19, further comprising un-shorting the first and second wires in response to detecting the start-of-communication signal.

21. The method of claim 17, further comprising:

powering up a first amplifier in response to detecting the start-of-communication signal, the first amplifier being connected between a signal output of the modem and the transmit line; and powering up a second amplifier in response to detecting the start-of-communication signal, the second amplifier being connected between the receive line and a signal input of the modem.

* * * * *